(12) United States Patent
Goyal et al.

(10) Patent No.: US 11,660,821 B2
(45) Date of Patent: May 30, 2023

(54) COLLABORATION OF THREE DIMENSIONAL PRINTING

(71) Applicant: International Business Machines Corporation, Armonk, NY (US)

(72) Inventors: Manoj Kumar Goyal, Bangalore (IN); Sarbajit K. Rakshit, Kolkata (IN); Raghuveer Prasad Nagar, Kota (IN); Manjit Singh Sodhi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 16/940,427

(22) Filed: Jul. 28, 2020

(65) Prior Publication Data

US 2022/0032548 A1 Feb. 3, 2022

(51) Int. Cl.
*B29C 64/393* (2017.01)
*G06T 19/20* (2011.01)
(Continued)

(52) U.S. Cl.
CPC ............ *B29C 64/393* (2017.08); *G03H 1/08* (2013.01); *G06F 3/014* (2013.01); *G06T 19/20* (2013.01); *G06T 2219/024* (2013.01)

(58) Field of Classification Search
CPC ...... B29C 64/393; B29C 64/386; G03H 1/08; G06F 3/014; G06F 3/011; G06F 13/10;
(Continued)

(56) References Cited

U.S. PATENT DOCUMENTS

2013/0144566 A1* 6/2013 De Biswas ............ H04W 4/21
703/1
2015/0039113 A1 2/2015 Kanada
(Continued)

FOREIGN PATENT DOCUMENTS

WO 2017115076 A1 7/2017
WO 2017208100 A1 12/2017

OTHER PUBLICATIONS

"Apple introduces us to the Apple Ring in all its Glory", Patently Apple, Oct. 1, 2015, 10 pages, <https://www.patentlyapple.com/patently-apple/2015/10/apple-introduces-us-to-the-apple-ring-in-all-its-glory.html>.

(Continued)

*Primary Examiner* — Thomas C Lee
*Assistant Examiner* — Michael Tang
(74) *Attorney, Agent, or Firm* — Christopher M. Pignato

(57) ABSTRACT

A system for manipulating a 3D object for a computing device is provided. A computer device identifies one or more sensors worn by a user, wherein the one or more sensors track the user's hand and finger movements. The computing device monitors during production of a three dimensional (3D) object, the one or more sensors for modification to a holographic projection representing the 3D object, wherein the user's hand and finger movements modify the holographic projection representing the 3D object. A computing device identifies a modification to the 3D object represented by the holographic projection. A computing device generates a modification request based, at least in part, on the identified modification. The computing device updates production of the 3D object, based, at least in part, on the modification request.

20 Claims, 9 Drawing Sheets

(51) Int. Cl.
*G03H 1/08* (2006.01)
*G06F 3/01* (2006.01)
(58) Field of Classification Search
CPC ............... G06T 19/20; G06T 2219/024; G06T 2219/2021; B33Y 50/00; B33Y 50/02
See application file for complete search history.

(56) References Cited

U.S. PATENT DOCUMENTS

| | | | | |
|---|---|---|---|---|
| 2016/0054726 | A1* | 2/2016 | Yoo | G05B 19/4099 700/118 |
| 2017/0173889 | A1* | 6/2017 | Thomas-Lepore | H04L 51/046 |
| 2017/0186064 | A1* | 6/2017 | Kaptsan | G06Q 50/01 |
| 2018/0059644 | A1* | 3/2018 | Lection | G05B 19/4099 |
| 2018/0136815 | A1* | 5/2018 | Tomizuka | G06F 3/011 |
| 2018/0284692 | A1* | 10/2018 | Kline | B33Y 50/00 |
| 2018/0290397 | A1 | 10/2018 | Yu | |

OTHER PUBLICATIONS

"EasyMeasure on the App Store", Apple, Accessed Mar. 5, 2020, 2:12 PM, ©2010 Caramba App Development, 4 pages,<https://apps.apple.com/in/app/easymeasure-measure-your-camera/id349530105>.

"Leap Motion Controller", Ultraleap, Accessed Mar. 5, 2020, 1:42 PM, 6 pages, <https://www.ultraleap.com/product/leap-motion-controller/>.

"Method and system for holographic object regeneration to minimize the effect of obstacle created during hand based interaction", Prior Art Database Technical Disclosure, Disclosed Anonymously, IPCOM000249520D, Mar. 2, 2017, 5 pages.

"Samsung Invents a Holographic Device and Specialized Display", Patently Mobile, Jun. 1, 2015, 4 pages, <https://www.patentlymobile.eom/2015/06/samsung-invents-a-holographic-device-and-specialized-display.html>.

Dordevic et al., "MC Sensor—A Novel Method for Measurement of Muscle Tension", Sensors, 2011, 11, pp. 9411-9425.

Edwards, C., "Put a Ring On It Apple invents 'smart ring' that lets you control your iPhone without even touching it", The Sun, Digital Technology and Science Reporter, Updated Oct. 17, 2019, 13 pages.

Edwards, L., "Samsung Galaxy S7 to feature world's first holographic smartphone display?", Pocket-lint, Aug. 12, 2015, 4 pages, <https://www.pocket-lint.com/phones/news/samsung/134897-samsung-galaxy-s7-to-feature-world-s-first-holographic-smartphone-display>.

Ellery, B., "With this ring I thee text . . . so will the iRing by Apple's tiniest gadget yet?", Daily Mail, Oct. 10, 2015, 32 pages, <https://www.dailymail.co.uk/sciencetech/article-3267818/Will-iRing-Apple-s-tiniest-gadget-yet.html>.

Jaszly, A., "Apple patents a Smart Ring, could it replace Apple Watch?", GIZMOCHINA, Oct. 17, 2019, 3 pages, <https://www.gizmochina.com/2019/10/17/apple-patents-an-apple-ring-could-it-replace-the-apple-watch/>.

Mell et al., "The NIST Definition of Cloud Computing", Recommendations of the National Institute of Standards and Technology, NIST Special Publication 800-145, Sep. 2011, 7 pages.

* cited by examiner

COLLABORATION OF THREE DIMENSIONAL PRINTING

BACKGROUND OF THE INVENTION

The present invention relates generally to the field of three-dimensional (3D) printing, and more particularly to the use of 3D printing in combination with holographic projections.

Generally, the 3D printing process builds a three-dimensional object from a computer-aided design program. The 3D printing process successively adds material one layer at a time to build an object. As technology has evolved, holographic projections have been associated with 3D printing to provide users with an opportunity to review a 3D object before it has been printed by a 3D printer.

SUMMARY

Embodiments of the present invention provide a method, system, and program product for a system for manipulating a 3D object in the process of additive manufacturing.

A first embodiment encompasses a method for manipulating a 3D object in the process of additive manufacturing. One or more processors identify one or more sensors worn by a user, wherein the one or more sensors track the user's hand and finger movements. One or more processors monitor during production of a three dimensional (3D) object, the one or more sensors for modification to a holographic projection representing the 3D object, wherein the user's hand and finger movements modify the holographic projection representing the 3D object. One or more processors identify a modification to the 3D object represented by the holographic projection. One or more processors generate a modification request based, at least in part, on the identified modification. One or more processors update production of the 3D object, based, at least in part, on the modification request.

A second embodiment encompasses a computer program product for manipulating a 3D object in the process of additive manufacturing. The computer program product includes one or more computer readable storage media and program instructions stored on the one or more computer-readable storage media. The program instructions include program instructions to identify one or more sensors worn by a user, wherein the one or more sensors track the user's hand and finger movements. The program instructions include program instructions to monitor during production of a three dimensional (3D) object, the one or more sensors for modification to a holographic projection representing the 3D object, wherein the user's hand and finger movements modify the holographic projection representing the 3D object. The program instructions include program instructions to identify a modification to the 3D object represented by the holographic projection. The program instructions include program instructions to generate a modification request based, at least in part, on the identified modification. The program instructions include program instructions to update production of the 3D object, based, at least in part, on the modification request.

A third embodiment encompasses a computer system for manipulating a 3D object in the process of additive manufacturing. The computer system includes one or more computer processors, one or more computer-readable storage media, and program instructions stored on the computer-readable storage media for execution by at least one of the one or more processors. The program instructions include program instructions to identify one or more sensors worn by a user, wherein the one or more sensors track the user's hand and finger movements. The program instructions include program instructions to monitor during production of a three dimensional (3D) object, the one or more sensors for modification to a holographic projection representing the 3D object, wherein the user's hand and finger movements modify the holographic projection representing the 3D object. The program instructions include program instructions to identify a modification to the 3D object represented by the holographic projection. The program instructions include program instructions to generate a modification request based, at least in part, on the identified modification. The program instructions include program instructions to update production of the 3D object, based, at least in part, on the modification request.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
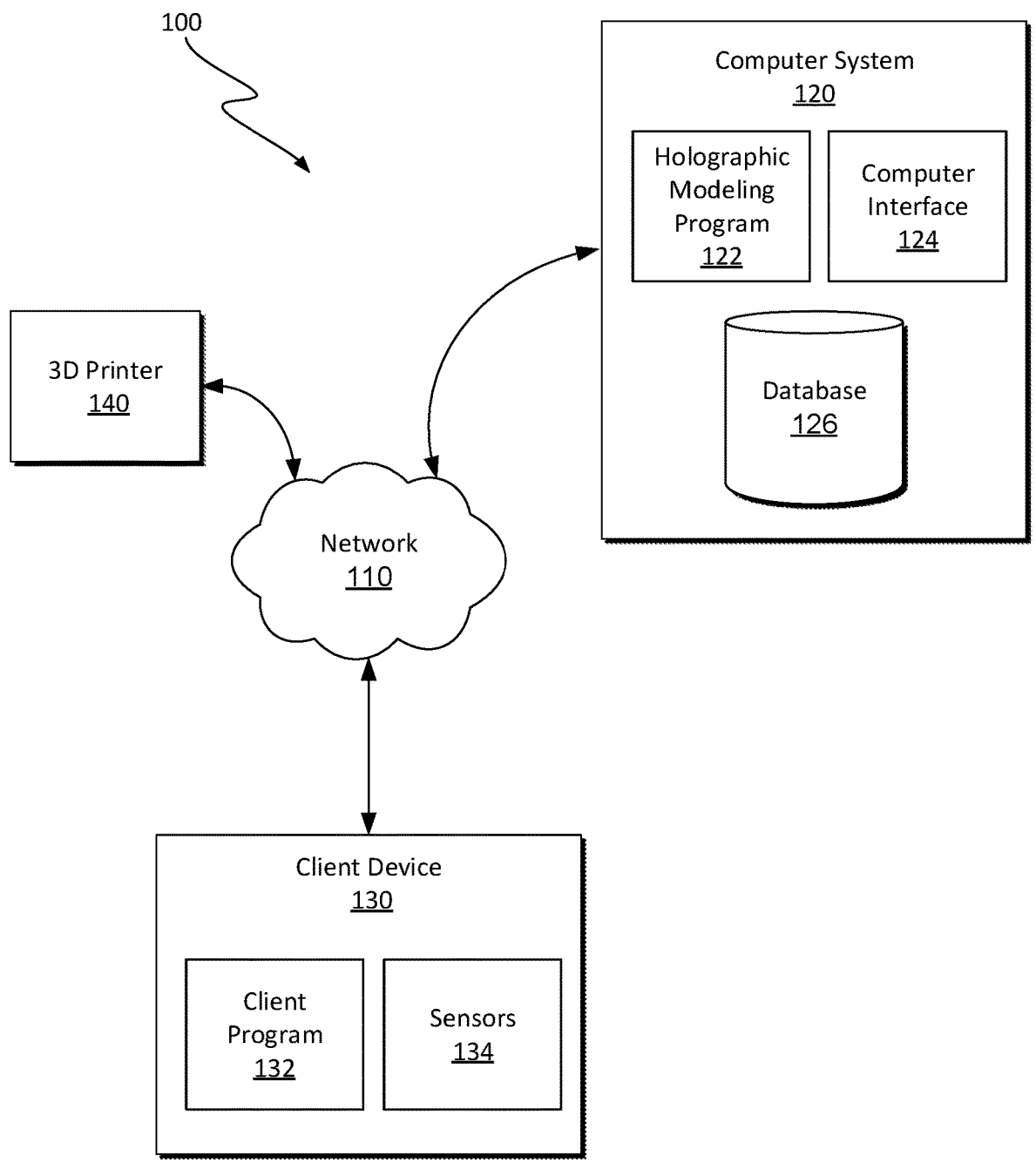
FIG. 1 is a functional block diagram illustrating a computing environment, in which a system manipulates a 3D object in the process of additive manufacturing, accordance with an exemplary embodiment of the present invention.

FIG. 1 is a functional block diagram illustrating computing environment, generally designated 100, in accordance with an embodiment of the present invention. Computing environment 100 includes computer system 120, client device 130, and 3D printer 140. Computer system 120 includes holographic modeling program 122, computer interface 124, and database 126. Client device 130 includes client program 132 and sensors 134.

In various embodiments of the present invention, computer system 120 is a computing device that can be a standalone device, a server, a laptop computer, a tablet computer, a netbook computer, a personal computer (PC), a personal digital assistant (PDA), a smartwatch, a desktop computer or any programmable electronic device capable of executing machine readable program instructions and communications with client device 130 and 3D printer 140. In another embodiment, computer system 120 represents a computing system utilizing clustered computers and components to act as a single pool of seamless resources. In general, computer system 120 can be any computing device or a combination of devices with access to client device 130, 3D printer 140, and network 110 and is capable of executing holographic modeling program 122, computer interface 124, and database 126. Computer system 120 may include internal and external hardware components as depicted and described in further detail with respect to FIG. 6.

In this exemplary embodiment, holographic modeling program 122 and computer interface 124 are stored on computer system 120. However, in other embodiments, holographic modeling program 122 and computer interface 124 may be stored externally and accessed through a communication network, such as network 110. Network 110 can be, for example, a local area network (LAN), a wide area network (WAN) such as the Internet, or a combination of the two, and may include wired, wireless or any other connection known in the art. In general, network 110 can be any combination of connections and protocols that will support communications between computer system 120, client device 130, and 3D printer, in accordance with a desired embodiment of the present invention.

Holographic modeling program 122 is depicted in FIG. 1 for illustrative simplicity. In various embodiments of the present invention, holographic modeling program 122 represents logical operations executing on computer system 120, where computer interface 124 manages the ability to view these logical operations and their results on computer system 120. Computer system 120 can include any number of logical operations that are managed and executed in accordance with holographic modeling program 122. In some embodiments, holographic modeling program 122 represents a holographic simulation that analyzes input and output (I/O) data. Additionally, holographic modeling program 122, when executing a holographic simulation processing, operates to monitor the I/O that was analyzed and generates a modification based on, but not limited to, the analyzation operation. In some embodiments, holographic modeling program 122 determines whether a specific action is likely to take place and generates a modification request and communicates a notification to 3D printer 140 that a modification, alteration, or reshaping occurred to the 3D object.

Computer system 120 includes computer interface 124. Computer interface 124 provides an interface between computer system 120, client device 130, and 3D printer 140. In some embodiments, computer interface 124 can be a graphical user interface (GUI), a web user interface (WUI), or an image projector and can display text, documents, web browser, windows, user options, application interfaces, instruction for operation, images, and holography display, and includes the information (such as graphic, text, and sound) that a program presents to a user and the control sequences the user employs to control the program. In some embodiments, computer system 120 accesses data communicated from client device 130 via a client-based application that runs on computer system 120. For example, computer system 120 includes mobile application software that provides an interface between computer system 120, client device 130, and 3D printer 140.

In various embodiments of the present invention, client device 130 is a computing device that can be a standalone device, a server, a laptop computer, a tablet computer, a netbook computer, a personal computer (PC), a personal digital assistant (PDA), a smartwatch, a desktop computer, a smart ring or any programmable electronic device capable of executing machine readable program instructions and communications with computer system 120 and 3D printer 140. In another embodiment, client device 130 represents a computing system utilizing clustered computers and components to act as a single pool of seamless resources with access to computer system 120, 3D printer 140 and network 110 and is capable of executing client program 132 and sensors 134. Client device 130 may include internal and external hardware components as depicted and described in further detail with respect to FIG. 6.

Sensors 134 are depicted in FIG. 1 for illustrative simplicity. In various embodiments of the present invention, sensors 134 represent various computing devices executing on client device 130, where sensors 134 communicate data to client program 132. In various embodiments, sensors 134 represent computing devices that monitor and determine hand movements of a user of client device 130. In various embodiments, sensors 134 determine whether specific action is likely to take place and generate data that is communicated to client program 132, wherein client program 132 generates a digital modification and communicates the digital modification to holographic modeling program 122. Additionally, various other sensors 134 are present in FIG. 1 (not shown), in which one or more users utilizes one or more sensors 134 to generate a digital modification. In various embodiments of the present invention, sensors 134 include various sensors within one or more ring devices, including, but are not limited to, (i) one or more gyroscopes which can be used to track hand and finger movements and the amount of angular velocity produced; (ii) muscle contraction sensors, wherein the muscle contraction sensors measure the muscle tension applied by the muscles; and (iii) one or more optimal movement tracking modules, wherein the optimal movement tracking modules are small peripheral devices capable of tracking hand and finger movements and incorporating those movements into manipulation of a holographic object.

In various embodiments of the present invention, 3D printer 140 is a computing device that represents any programmable electronic device capable of executing machine readable program instructions and communicates with computer system 120 and client device 130. In some embodiments, 3D printer 140 represents a computing device capable of executing a computer-aided design model and is further capable of processes where material is joined or solidified by machine readable program instructions.

In various embodiments of the present invention, an array of cameras is attached to 3D printer 140. In these embodiments, the array of cameras captures the progress of the current state of the 3D object being printed. In some embodiments, the images are collated to represent the 3D object. This data is sent to holographic modeling program 122 for analyzation and comparison to determine whether a conflict alert or an incompatibility alert should be generated.

In various embodiments, alternatively, holographic modeling program 122 communicates with 3D printer 140 and access data associated with (i) the computer-generated model of the 3D object and (ii) the percent completed of the 3D object by 3D printer 140 for analyzation and comparison to determine whether a conflict alert or an incompatibility alert should be generated.

In various embodiments of the present invention, holographic modeling program 122 receives I/O data in the form of, i.e., is included as a part of, a computer-aided design (CAD). In various embodiments, the data represents a digital object generated by CAD. Holographic modeling program 122 analyzes the digital object and prepares the digital object for holographic projection. In various embodiments, holographic modeling program 122 communicates the data that represents the 3D object to computer interface 124 with program instructions instructing computer interface 124 to generate a holographic projection of the 3D object. Additionally, in various embodiments, holographic modeling program 122 communicates the data representing the 3D object to 3D printer 140 with program instructions instructing 3D printer 140 to create the 3D object through additive manufacturing. In various embodiments, 3D printer 140 begins creating the 3D object through additive manufacturing.

In various embodiments of the present invention, holographic modeling program 122 continuously monitors for device pairing with sensors 134. In various embodiments, holographic modeling program 122 monitors at various time periods of the 3D printing process for device pairing by sensors 134. In some embodiments, holographic modeling program 122 receives a device pairing request from sensors 134. Holographic modeling program 122 analyzes the device pairing request and authorizes the use of sensors 134 by a user of client device 130 to modify, alter, or reshape a 3D object that 3D printer 140 is creating.

In various embodiments, holographic modeling program 122 actively monitors for data received from client device 130 (e.g., receives a digital modification). In various embodiments, a user of client device 130 utilizes sensors 134 to modify, alter, or reshape the 3D object represented by the holographic projection of computer interface 124. Embodiments of the present invention recognize that sensors 134 monitor the hand and finger movements of the user of client device 130 and identify when the user modifies, alters, or reshapes the 3D object represented by the holographic projection of computer interface 124. In various embodiments, sensors 134 identify that the user wishes to make one or more modifications, alterations, or reshaping that includes one or a combination of (i) inverting, (ii) rotating, (iii) removing, (iv) adding, (v) dissecting, or (vi) separating various segments of the 3D object. The present invention recognizes that while the 3D object is being created, a user of client device 130 is able to modify, alter, or reshape the 3D object during its creation. In an alternative embodiment, sensors 134 recognize when a portion of the 3D object has already been created. When a portion of the 3D object has already been created by 3D printer 140, sensors 134 communicate to the user of client device 130 that this portion of the 3D object has already been created. Additionally, sensors 134 request the user to authorize if any data related to a modification, alteration, or reshape to the 3D object should be stored for subsequent 3D printing processes. In some embodiments, a user of client device 130 authorizes that any modification, alteration, or reshape to a portion of the 3D object that has already been created should be stored for subsequent 3D printing processes. In yet, another embodiment, a user of client device 130 does not authorize that any modification, alteration, or reshape to a portion of the 3D object that has already been created should be stored for subsequent 3D printing processes.

In various embodiments of the present invention, FIG. 1 includes one or more user of client device 130, and more specifically, one or more users utilizing sensors 134 simultaneously to modify, alter, or reshape the 3D object represented by the holographic projection of computer interface 124. In various embodiments, FIG. 1 represents a multi-use collaboration system, wherein one or more users modify, alter, or reshape the 3D object represented by the holographic projection of computer interface 124. In various embodiments of the present invention, sensors 134 identify that one or more users modify, alter, or reshape the 3D object represented by the holographic projection of computer interface 124. Sensors 134 determines that a digital modification has been made to the 3D object. Sensors 134 communicates this data to client program 132.

In various embodiments, sensors 134 communicate data to client program 132. Embodiments of the present invention recognize that the data includes one or a combination of (i) data representing a modification, alteration, or reshape to the 3D object actively being created by 3D printer 140, (ii) a modification, alteration, or reshape to the 3D object for subsequent creation by 3D printer 140, or (iii) multi-use collaboration system to modify, alter, or reshape the 3D object represented by a holographic projection of computer interface 124. In various embodiments, client program 132 generates a digital modification of the 3D object and communicates the digital modification to holographic modeling program 122.

In some embodiments of the present invention, holographic modeling program 122 receives I/O data in the form of, i.e., is included as a part of, a digital modification from client device 130 connected over network 110, but embodiments of holographic modeling program 122 are not limited thereto. In various embodiments, holographic modeling program 122 analyzes the digital modification and identifies one or a combination of (i) one or more modifications, alterations, or reshapes to the 3D object being created, (ii) whether the portion of the 3D object modified, altered, or reshaped has already been created, or (iii) whether the modification, alteration, or reshape is for subsequent use.

In various embodiments, holographic modeling program 122 determines that a digital modification has been made to a portion of the 3D object that has not yet been created through additive manufacturing. Embodiments of the present invention recognize that 3D printing requires a threshold period of time to create a 3D object, wherein one layer is added to the 3D object at a time through additive manufacturing. In various embodiments, holographic modeling program 122 generates a modification request based on, but not limited to, the digital modification and communicates the modification request to 3D printer 140. In various embodiments, holographic modeling program 122 communicates the modification request with program instructions instructing 3D printer 140 to include the digital modification to the 3D object. In various embodiments, holographic modeling program 122 actively monitors for one or more digital modifications and communicates one or more additional modification requests upon receiving a digital modification from client program 132.

In various embodiments of the present invention, holographic modeling program 122 monitors for one or more digital modifications from one or more users during a threshold period of time (e.g., the time period it takes to complete the 3D object). In some embodiments, holographic modeling program 122 communicates one or more modification requests from one or more digital modifications (e.g., one or more modifications by one or more users) to 3D printer 140 with program instructions instructing 3D printer 140 to include the digital modifications to the 3D object.

Embodiments of the present invention provide for a system that includes finger ring devices (e.g., sensors 134) that include holographic projectors, wherein the finger ring devices project a holographic object within the proximity of the users hands. In various embodiments, the finger ring devices will be pair to client device 130 and will collect data signals in regard to the manipulation of the holographic object based on, at least, the movement of the user's hands utilizing the finger ring devices. In various embodiments, client device 130 is connected to 3D printer 140. In various embodiments, a user can manipulate the holographic object modify, alter, or reshape various portions of the holographic object. In various embodiments, the user's hands will include a plurality of finger ring devices, wherein each finger ring device will communicate with each other and communicate data based on the relative position of each finger ring device, and the finger ring devices will track the hand and individual finger movement.

Embodiments of the present invention further provide the finger ring devices track the movement of the user's hands and fingers and orientate the holographic object relative to the position and direction of the user's hands and fingers. In various embodiments of the present invention, this allows the user to visualize the object that is currently being printed as a hologram and further allows the user to make modifications to the object currently being printed based, at least, on the movement of the user's hands and fingers. In various embodiments, the user can alter the shape, dimension, and texture of the portion of the object currently not yet printed by 3D printer 140. In various embodiments, holographic modeling program 122 receives the modification request generated by the user's modification of the holographic object. Holographic modeling program 122 analyzes the modification and determines that the modification to the 3D printer has not already been printed. In various embodiments, holographic modeling program 122 communicates the modification to 3D printer 140 to incorporate the modification to the unprinted portion of the 3D object.

Embodiments of the present invention provide for a multi-use collaboration system, wherein the plurality of users can individually modify, reshape or alter the shape, dimension, etc. of the holographic object. In various embodiments, holographic modeling program 122 analyzes each individual modification to the holographic object that is representative of the object being printed by 3D printer 140. Holographic modeling program 122 generates a modification request and communicates the one or more modification requests to 3D printer 140 to incorporate the modifications into the object being printed.

Figure 2:
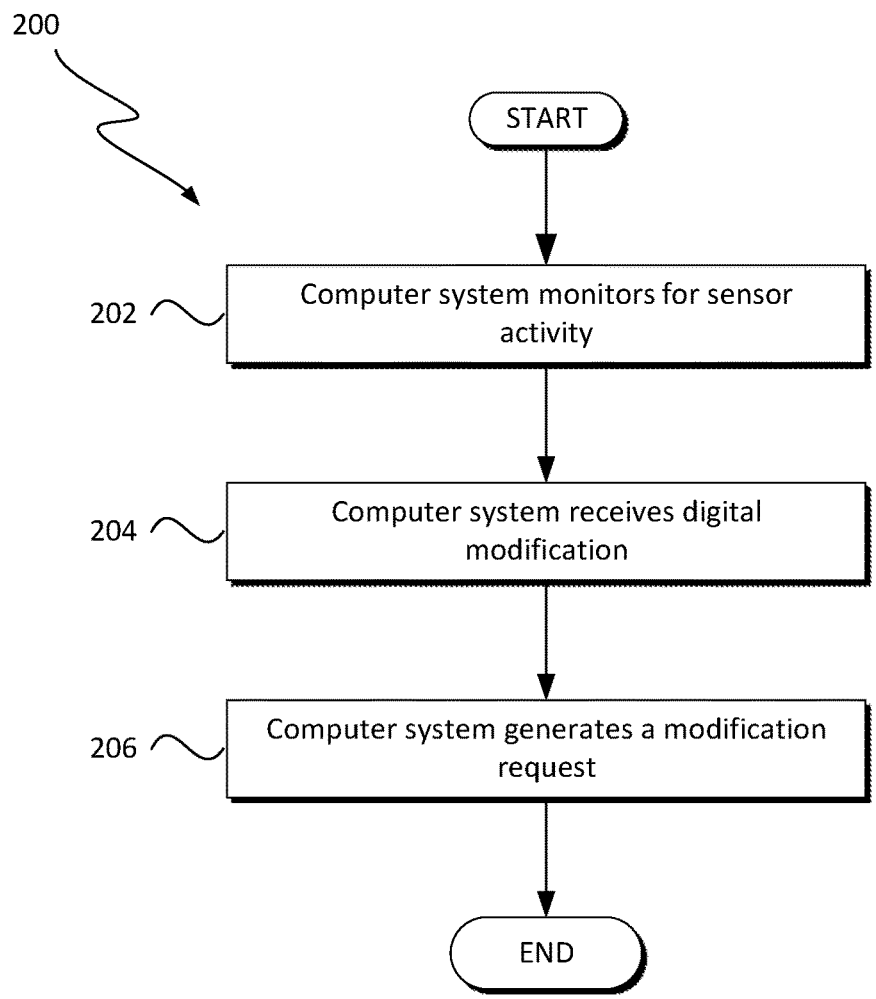
FIG. 2 illustrates operational processes of executing a system generating a request to modify a 3D object in the process of additive manufacturing, on a computing device within the environment of FIG. 1, in accordance with an exemplary embodiment of the present invention.

FIG. 2 is a flowchart depicting operations for a 3D modification alert system for computing environment 100, in accordance with an illustrative embodiment of the present invention. More specifically, FIG. 2, depicts combined overall operations 200, of holographic modeling program 122. In some embodiments, operations 200 represents logical operations of holographic modeling program 122, wherein holographic modeling program 122 represents interactions between logical computing devices communicating with computer system 120 and various other computing devices connected to network 110. It should be appreciated that FIG. 2 provides an illustration of one implementation and does not imply any limitations with regard to the environments in which different embodiments may be implemented. Many modifications to the depicted environment may be made. In one embodiment, the series of operations, in flowchart 200, can be terminated at any operation. In addition to the features previously mentioned, any operations of flowchart 200, can be resumed at any time.

In operation 202, holographic modeling program 122 monitors for sensors 134 activity. In various embodiments, holographic modeling program 122 continuously monitors for sensors 124 device pairing. In various embodiments, holographic modeling program 122 monitors at various time periods of the 3D printing process for device pairing by sensors 124. In some embodiments, holographic modeling program 122 receives a device pairing request from sensors 124. Holographic modeling program 122 analyzes the device pairing request and authorizes the use of sensors 124 by a user of client device 130 to modify, alter, or reshape a 3D object that 3D printer 140 is creating.

In various embodiments of the present invention, holographic modeling program 122 identifies one or more sensors 134 activity. More specifically, holographic modeling program 122 identifies one or more users of sensors 134 device pairing requests. Holographic modeling program 122 determines that one or more users wish to be authorized to modify, alter, or reshape a 3D object represented by a holographic projection of computer interface 124 through a multi-use collaboration system. In various embodiments, holographic modeling program 122 authorizes the use of one or more users of sensors 124 for a multi-use collaboration system.

The present invention recognizes that sensors 134 monitor the hand and finger movements of the user of client device 130 and identify when the user modifies, alters, or reshapes the 3D object represented by the holographic projection of computer interface 124. In various embodiments, sensors 134 identify that the user wishes to make one or more modifications, alterations, or reshaping that includes one or a combination of (i) inverting, (ii) rotating, (iii) removing, (iv) adding, (v) dissecting, or (vi) separating various segments of the 3D object. The present invention recognizes that while the 3D object is being created, a user of client device 130 is able to modify, alter, or reshape the 3D object during its creation. In an alternative embodiment, holographic modeling program 122 recognizes when a portion of the 3D object has already been created. When a portion of the 3D object has already been created by 3D printer 140, holographic modeling program 122 communicates an alert to the user of client device 130 that this portion of the 3D object has already been created. Additionally, holographic modeling program 122 requests the user to authorize if any data related to a modification, alteration, or reshape to the 3D object should be stored for subsequent 3D printing processes. In some embodiments, a user of client device 130 authorizes that any modification, alteration, or reshape to a portion of the 3D object that has already been created should be stored for subsequent 3D printing processes. In yet, another embodiment, a user of client device 130 does not authorize that any modification, alteration, or reshape to a portion of the 3D object that has already been created should be stored for subsequent 3D printing processes.

In operation 204, holographic modeling program 122 receives one or more digital modifications from client program 132. In various embodiments of the present invention, a user of client device 130 utilizes sensors 134 to modify, alter, or reshape a 3D object represented by a holographic projection of computer interface 124. Sensors 134 communicate the data associated with the modify, alter, or reshape to client program 132, where client program 132 generates a digital modification of the 3D object represented by the holographic projection of computer interface 124. In various embodiments, holographic modeling program 122 analyzes the one or more digital modifications and identifies what portions of the 3D object have been modified, altered, or reshaped based on, but not limited to, the user interaction utilizing sensors 134. In various embodiments, holographic modeling program 122 further determines whether the specific portion of the 3D object that has been modified, altered, or reshaped has already been created 3D printer 140.

In operation 206, holographic modeling program 122 generates a modification request. In various embodiments, holographic modeling program 122 generates a modification request based on, but not limited to, the analyzation of the one or more digital modifications. In some embodiments, holographic modification program 122 determines that the portion of the 3D object that has been digitally modified has not yet been created by 3D printer 140. Holographic modeling program 122 generates a modification request based on, but not limited to, the one or more digital modifications and communicates the modification request with program instructions instructing 3D printer 140 to include the digital modification to the CAD design of the 3D object and further, to create the 3D object with the one or more digital modifications.

In various embodiments, holographic modeling program 122 analyzes the digital modification and identifies that the portion of the 3D object that was digitally modified has already been created by 3D printer 140. Holographic modeling program 122 further analyzes the digital modification and the portion of the 3D object that has already been created to determine whether the digital modification can be applied to the portion of the 3D object that has already been created. In various embodiments, holographic modeling program 122 determines that the digital modification can be included into the portion of the 3D object that has already been created and generates a modification request, as recognized above.

In various embodiments, holographic modeling program 122 analyzes one or more digital modifications through a multi-use collaboration system and identifies that the portion of the 3D object that was digitally modified has already been created by 3D printer 140. Holographic modeling program 122 further analyzes the one or more digital modification and the portion of the 3D object that has already been created to determine whether the digital modification can be applied to the portion of the 3D object that has already been created. In various embodiments, holographic modeling program 122 determines that the digital modification can be included into the portion of the 3D object that has already been created. Holographic modeling program 122 generates a modification request associated with the one or more digital modifications of a multi-use collaboration system and communicates the modifications request with program instructions to 3D printer 140 instructing 3D printer 140, as recognized above.

Figure 3:
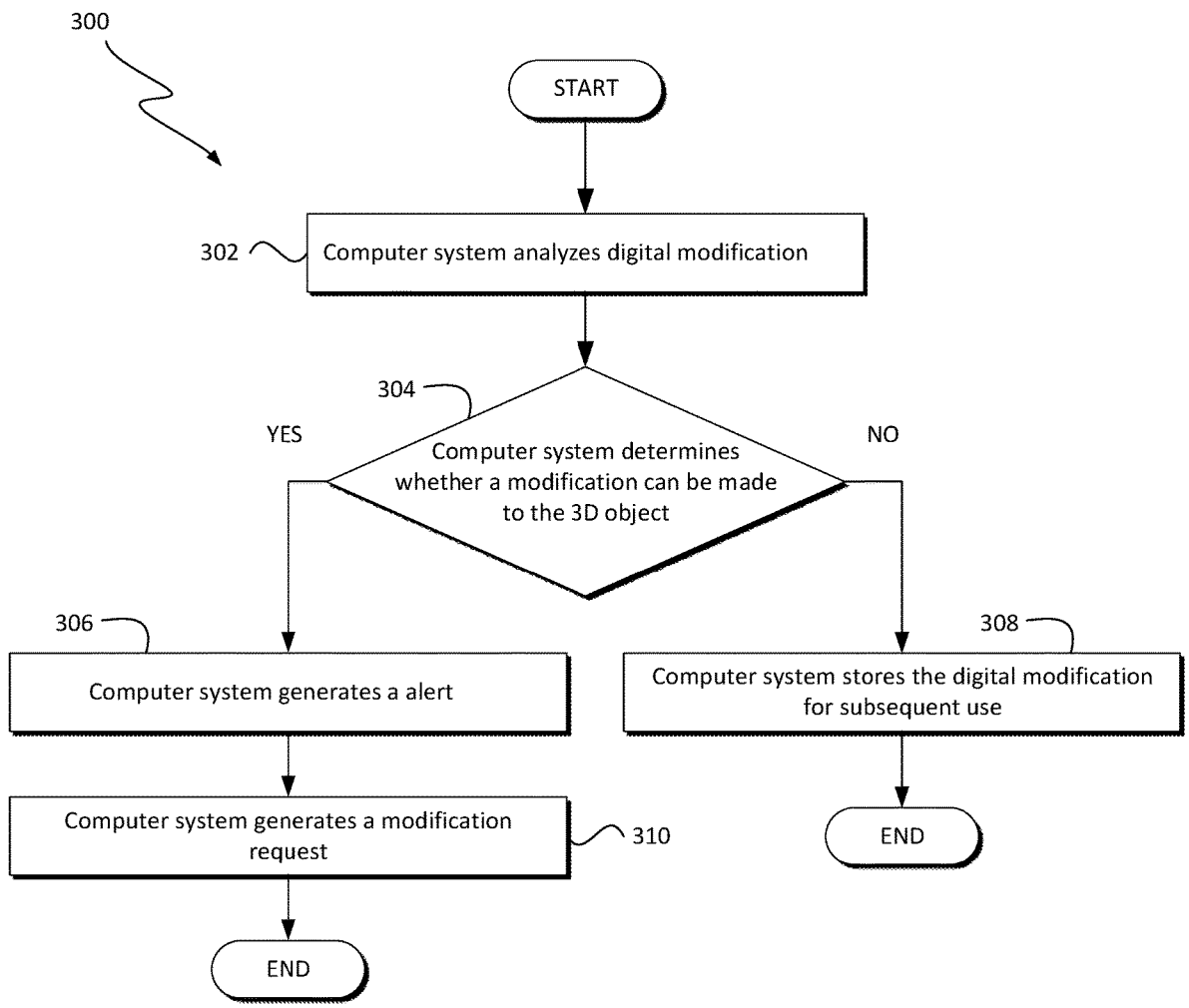
FIG. 3 illustrates operational processors of executing a system for generating an alert for a 3D object in the process of additive manufacturing, on a computing device within the environment of FIG. 1, in accordance with an exemplary embodiment of the present invention.

FIG. 3 depicts flowchart, 300, depicting operations of holographic modeling program 122 in computing environment 100, in accordance with an illustrative embodiment of the present invention. More specifically, FIG. 3, depicts combined overall operations, 300, of holographic modeling program 122 executing on computer system 120. In some embodiments, operations 300 represents logical operations of holographic modeling program 122, wherein interactions between holographic modeling program 122, client program 132, and 3D printer 140 represents logical units executing on computer system 120. Further, operations 300 can include a portion or all of combined overall operations of 200. In various embodiments, the series of operations 300, can be performed at the conclusion of operations 200. In some embodiments, operations 300 can be performed simultaneously with operations 200. It should be appreciated that FIG. 3 provides an illustration of one implementation and does not imply any limitations with regard to the environments in which different embodiments may be implemented. Many modifications to the depicted environment may be made. In one embodiment, the series of operations, of flowchart 300, can be performed simultaneously. Additionally, the series of operations, in flowchart 300 can be terminated at any operation. In addition to the features previously mentioned, any operations of flowchart 300 can be resumed at any time.

In operation 302, holographic modeling program 122 analyzes one or more digital modifications. In various embodiments, holographic modeling program 122 receives one or more digital modifications from client program 132. The present invention recognizes that holographic modeling program 122 can receive one or more digital modifications from one or more users, either (i) simultaneously or (ii) at various time periods, utilizing sensors 134. Additionally, in various embodiments, holographic modeling program 122 identifies the portion of the 3D object that is to be modified, altered, or reshaped associated with the one or more digital modifications. In various embodiments, holographic modeling program 122 communicates with 3D printer 140 and requests which portions of the 3D object have already been created in the process of additive manufacturing of the 3D printing. Holographic modeling program 122 identifies which portions have already been created based on, but not limited to, the data received from 3D printer 140.

If holographic modeling program 122 determines that the digital modification can be made to the 3D object during the process of additive manufacturing of 3D printing (decision 304, YES branch), then holographic modeling program 122 generates a modification request and communicates the modification request to 3D printer 140 (operation 306). In various embodiments, the modification request includes program instructions instructing 3D printer 140 to include the modification, alteration, or reshape to the 3D object that is currently being created. Holographic modeling program 122 stores the digital modification for subsequent 3D printing of the 3D object.

If holographic modeling program 122 determines that the digital modification cannot be made to the 3D object during the process of additive manufacturing of 3D printing (decision 304, NO branch), then holographic modeling program 122 generates an incompatibility alert and communicates the incompatibility alert (operation 308). In various embodiments, the incompatibility alert includes one or a combination of (i) communication to the user of client device 130, (ii) notification that the portion of the 3D object to be modified, altered, or reshaped has already been created, (iii) notification that the portion of the 3D object cannot be modified, altered or reshaped because it has already been created, or (iv) request to store the digital modification for subsequent 3D printing processes. In various embodiments, holographic modeling program 122 communicates the incompatibility alert to client program 132 with program instructions instructing client program 132 to display the incompatibility alert to the user of client device 130 and to coach the user to select whether the user wishes to store the digital modification for subsequent uses. Additionally, the program instructions instruct client program 132 to communicate the user's response to holographic modeling program 122.

In operation 310, holographic modeling program 122 generates a modification request. Embodiments of the present invention provide that the modification request includes, but not limited to (i) a conflict alert and (ii) an incompatibility alert. In various embodiments of the present invention, holographic modeling program 122 analyzes one or more digital modifications received from one or more users of client device 130 of a multi-use collaboration system. In various embodiments, holographic modeling program 122 identifies one or more modifications, alterations, or reshapes of the 3D object associated with the one or more digital modifications. Holographic modeling program 122 determines that the one or more digital modifications received from one or more users of client device 130 of a multi-use collaboration system create a conflict. In an example embodiment, user A creates a digital modification of portion 1 of the 3D object, additionally, user B creates a digital modification to portion 1 of the 3D object, as well. Holographic modeling program 122 determines that the plurality of digital modifications create a conflict and cannot be added to the 3D object simultaneously. In various embodiments, holographic modeling program 122 generates a conflict alert. Holographic modeling program 122 communicates the conflict alert to client program 132 with program instructions instructing client program 132 to display the conflict alert to the one or more users of client device 130. Additionally, the program instructions instruct client program 132 to coach the one or more users to select one digital modification out of the plurality of conflicting digital modifications to incorporate into the 3D object. In an alternative embodiment, the one or more users of client device 130 wish to not include any of the plurality of digital modifications and wish to (i) store the plurality of digital modifications for subsequent use or (ii) generate an additional digital modification and communicate the additional digital modification to holographic modeling program 122.

Embodiments of the present invention provide for a multi-use collaboration system, where a plurality of users are able to modify, alter, or reshape portions of a 3D object being printed by 3D printer 140. In various embodiments, the multi-use collaboration system includes, but is not limited to, sensors 134 worn by the plurality of users of the multi-use collaboration system. In various embodiments of the multi-use collaboration system, a plurality of users is modifying, altering, or reshaping the 3D object represented by the holographic projection. In various embodiments, user A is modifying portion 1 of the 3D object represented by the holographic representation. Holographic modeling program 122 locks the 3D object represented by the holographic projection, by restricting user B from modifying, altering or reshaping portion 1, which user A is currently modifying, altering, or reshaping at a specific point in time.

Embodiments of the present invention provide for incompatibility alerts for the multi-use collaboration system. In various embodiments, user A is modifying, altering, or reshaping portion 1 of the 3D object represented by the holographic projection. In various embodiments, holographic modeling program 122 generates an incompatibility alert, where holographic modeling program 122 communicates the incompatibility alert to user B that informs user B that user A is currently modifying, altering, or reshaping portion 1 of the 3D object represented by the holographic projection. In some embodiments, holographic modeling program 122 locks portion 1 from user B and prevents user B from modifying, altering, or reshaping portion 1 while user A is modifying, altering, or reshaping portion 1. Additionally, in some embodiments, holographic modeling program 122 notifies user B when user A has completed modifying, altering or reshaping portion 1 of the 3D object represented by the holographic projection and unlocks portion 1 allowing user B to modify, alter, or reshape portion 1 of the 3D object represented by the holographic projection.

In various embodiments of the multi-use collaboration system, holographic modeling program 122 provides for modification rights, access, and authorization based on, at least, user specific portions. In various embodiments, various users are allowed to work on one or more portions of the 3D object represented by the holographic projection and are not allowed to work on various portions of the same 3D object represented by the holographic projection. Embodiments further provide that a plurality of users can modify, alter, or reshape the 3D object represented by the holographic projection simultaneously. In various embodiments, user A modifies portion 1 of the 3D object represented by the holographic projection and user B modifies portion 3 of the 3D object represented by the holographic projection. Embodiments of the present invention recognize that the plurality of users within the multi-use collaboration system utilize sensors 134 to provide the holographic projection of the 3D object and further provide for the modification, alteration, or reshaping of the 3D object represented by the holographic projection.

In various embodiments of the multi-collaboration system, holographic modeling program 122 provides for parallel modifications to the 3D object represented by the holographic projection of sensors 134. In various embodiments, a plurality of users can be modifying, altering, or reshaping the 3D object represented by the holographic projection. Additionally, the plurality of users of the multi-collaboration system can visually see the simulation of the modification, alteration, or reshape of the 3D object represented by the holographic projection by another user. In various embodiments, holographic modeling program 122 provides for parallel modifications that simulate the modification by user A and projects the modification through sensors 134 for user B to visualize the simulated modification by user A. In various embodiments, user B and modify, alter, or reshape the 3D object represented by the holographic projection in parallel with the modification of user B and holographic modeling program 122 will simulate the modification by user B and for user A to visualize.

Figure 4:
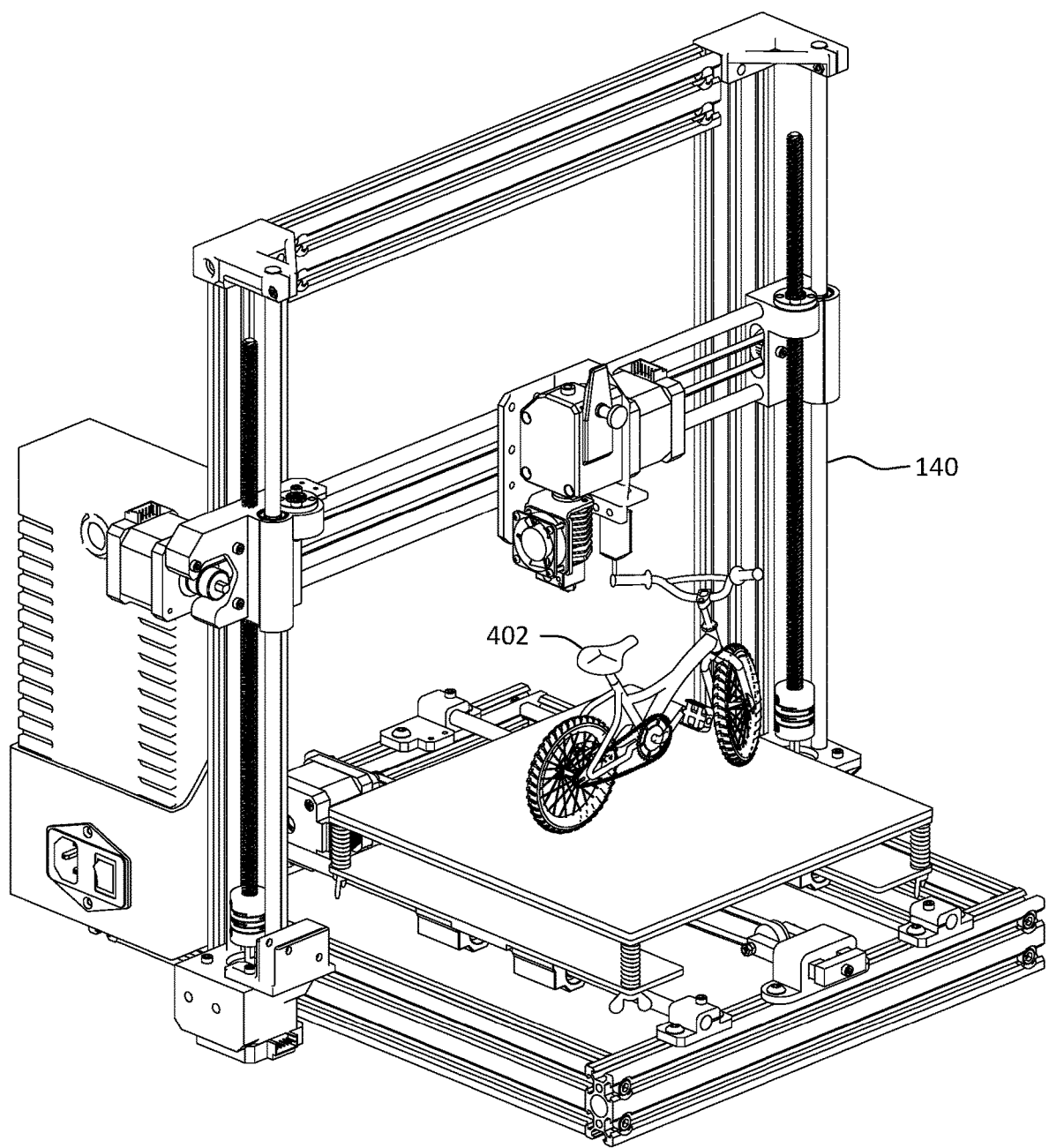
FIG. 4 depicts a 3D printer according to at least one embodiment of the present invention

FIG. 4 depicts 3D printer 140, wherein 3D printer 140 is actively printing 3D object 402. In various embodiments, 3D printer is communicatively connected to computer system 120. In various embodiments, 3D printer 140 prints the 3D object 402 based on, at least, the computer generated object provided by computer system 120. In various embodiments of the present invention, 3D printer 140 receives modification requests from holographic modeling program 122 to incorporate a modification, alteration, or reshape to the 3D object 403 currently being printed.

Figure 5:
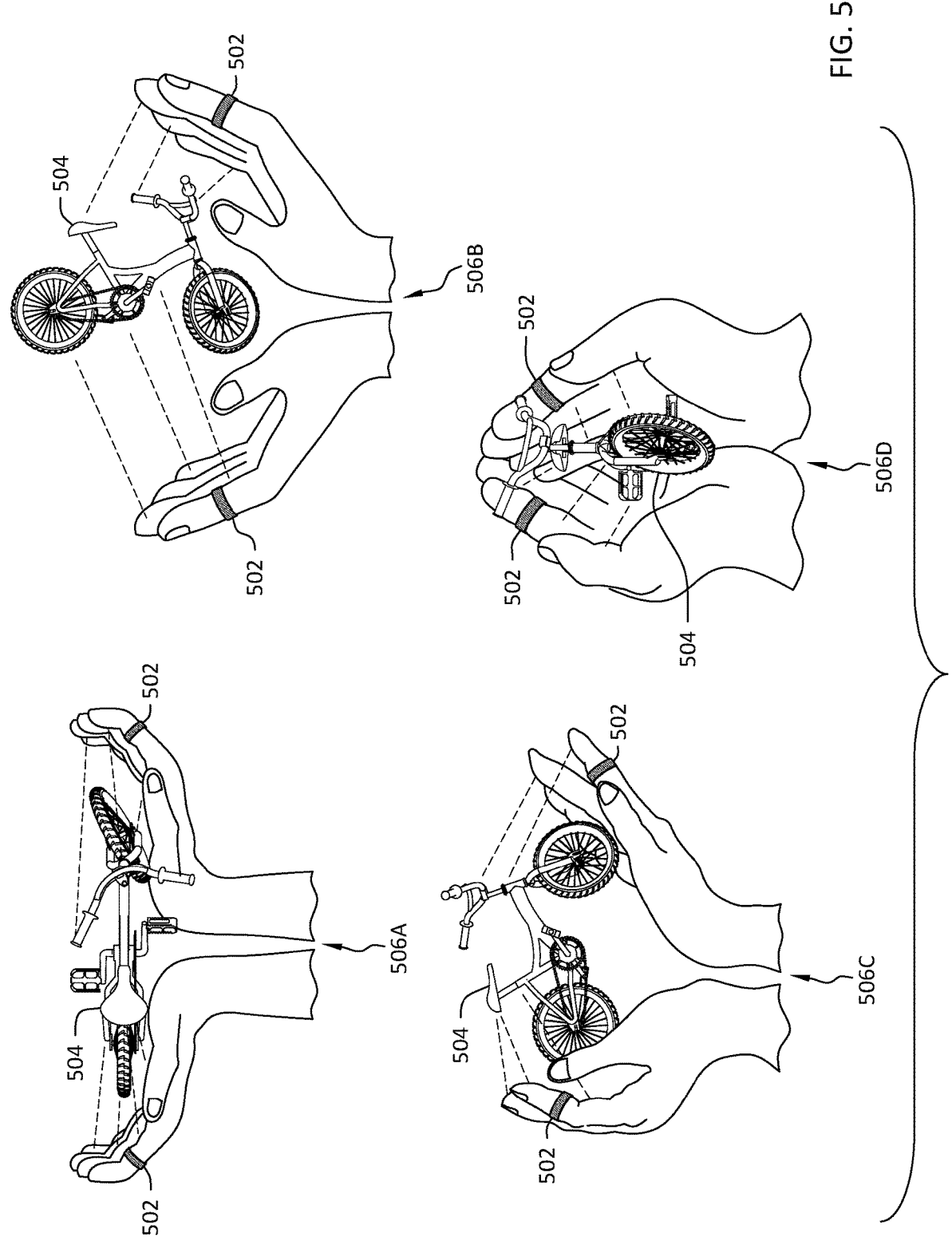
FIG. 5 depicts holographic image and hand movements and positions according to at least one embodiment of the present invention.

FIG. 5 is a block diagram depicting finger devices 502 worn by a user's hands and projects the holographic image of the object 504. In various embodiments, the user's hand and finger movements provide for any combination, orientation, movement or positioning of a virtual mechanical force applied against the holographic image of the object 504.

Embodiments of the present invention provide for finger devices 502 (e.g., sensors 134) to project a holographic image of the object 504. In various embodiments of the present invention, the finger devices 502 detect various movements of the user's hands and fingers 506A, 506B, 506C, and 506D as a virtual mechanical force is applied to the holographic image of the object 504.

Embodiments of the present invention provide hand and finger movements and positioning as 506A, 506B, 506C, and 506D for illustrative simplicity, and further provide that any combination, orientation, movement, or positioning can be utilized to apply a virtual mechanical force against the holographic object.

Figure 6:
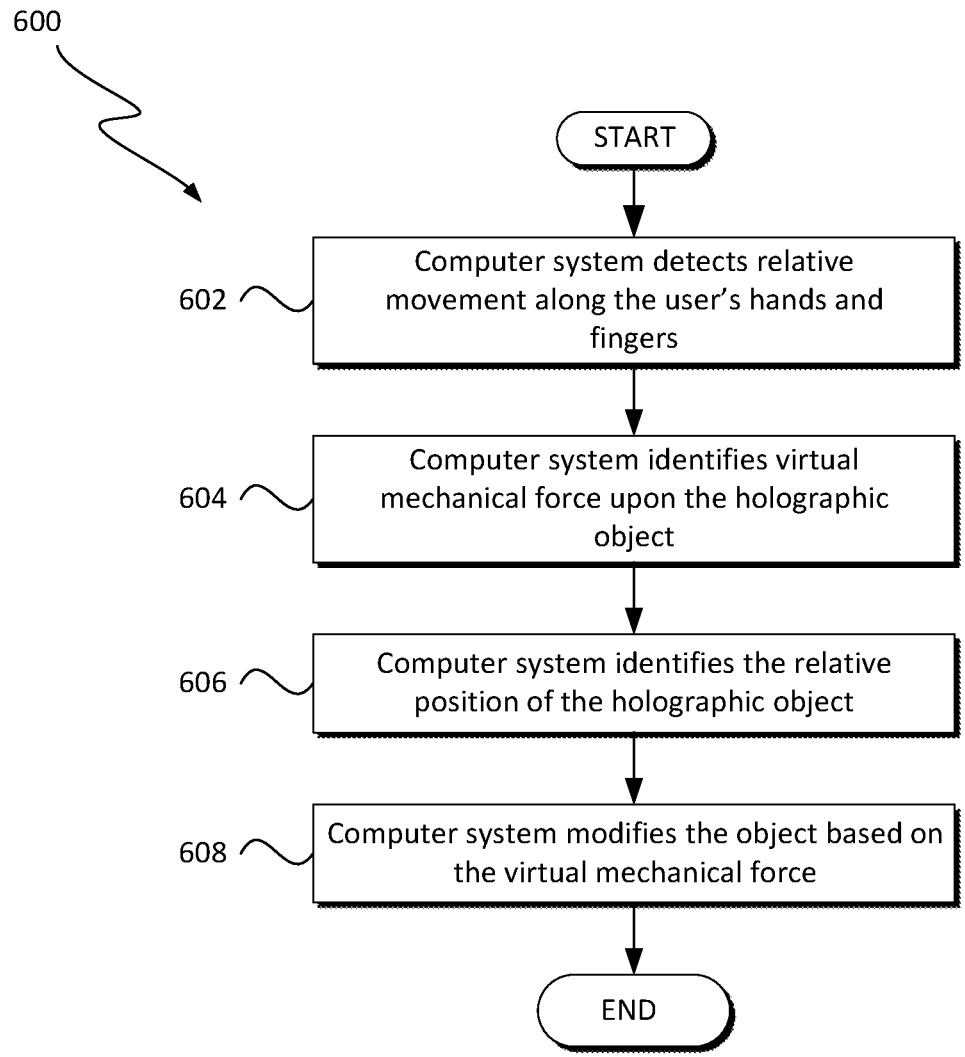
FIG. 6 illustrates operational process of executing a system for detecting hand and finger movements, on a computing device within the environment of FIG. 1, in accordance with an exemplary embodiment of the present invention.

FIG. 6 depicts flowchart, 600, depicting operations of holographic modeling program 122 in computing environment 100, in accordance with an illustrative embodiment of the present invention. More specifically, FIG. 6, depicts combined overall operations, 600, of holographic modeling program 122 executing on computer system 120. In some embodiments, operations 600 represents logical operations of holographic modeling program 122, wherein interactions between holographic modeling program 122, sensors 134, and 3D printer 140 represent logical units executing on computer system 120. Further, operations 600 can include a portion or all of combined overall operations of 200 and 300. In various embodiments, the series of operations 600, can be performed at the conclusion of operations 200 or the conclusion of 300. In some embodiments, operations 600 can be performed simultaneously with operations 200 and operations 300. It should be appreciated that FIG. 6 provides an illustration of one implementation and does not imply any limitations with regard to the environments in which different embodiments may be implemented. Many modifications to the depicted environment may be made. In one embodiment, the series of operations, of flowchart 600, can be performed simultaneously. Additionally, the series of operations in flowchart 600 can be terminated at any operation. In addition to the features previously mentioned, any operations of flowchart 600 can be resumed at any time.

In operation 602, sensors 134 detect relative movement of the user's hands or fingers. In various embodiments, sensors 134 detect when the user rotates, wiggles, flips, extends, or contracts their hands and fingers. Additionally, sensors 134, while projecting the holographic object, identify when the user moves their hands or fingers and apply a modification, reshape, or alteration to the holographic object.

In operation 604, sensors 134 identify when a user applies a virtual mechanical force upon the holographic object by detecting the user's movement of their hands or fingers. In various embodiments, the virtual mechanical force is a manipulation applied to the holographic object based on, but not limited to, various movements by the user's hands or fingers. In various embodiments, the sensors 134 track and analyze the user's hands and finger movement to calculate an amount of force that the user desires to apply to the holographic image of the object as if the holographic image of the object were a real, physical object. In various embodiments the amount of force could also be a ratio, wherein the more forceful the hand movement, the stronger the manipulation of the holographic object. Embodiments of the present invention recognize that the ratio of the virtual mechanical force does not need to be a 1 to 1 translation, but rather a threshold ratio of force.

In operation 606, sensors 134 identify the relative position of the holographic object. In various embodiments, the relative position of the holographic object can include, but is not limited to, (i) a global coordinate system, the user's local coordinate system, or the holographic object's parent's coordinate system, and these systems are associated with an x, y, and z axes. In some embodiments, the x, y, and z axes represent changes wherein, rotations around the x-axis are changes in pitch, rotations around the y-axis are changes in yaw, and rotations around the z-axis are changes in roll. In various embodiments, sensors 134 identifies that the holographic object's position has changed based on, but not limited to, the detected movement of the user's hands or fingers. In some embodiments, sensors 134 detect that the user has modified, altered, or reshaped the holographic object which includes, but is not limited to, removing portions of the holographic object, repositioning portions of the holographic object, and adding portions to the holographic object.

In operation 608, sensors 134 modify the holographic object based on, but not limited to, the virtual mechanical force identified applied to the holographic object. In various embodiments, holographic modeling program 122 receives this data from sensors 134 and analyzes the modification, alteration, or reshape and generates a modification request to incorporate the modifications of the holographic object to be applied to the object currently being 3D printed by 3D printer 140. In various embodiments, holographic modeling program 122 communicates the modification request to 3D printer 140.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
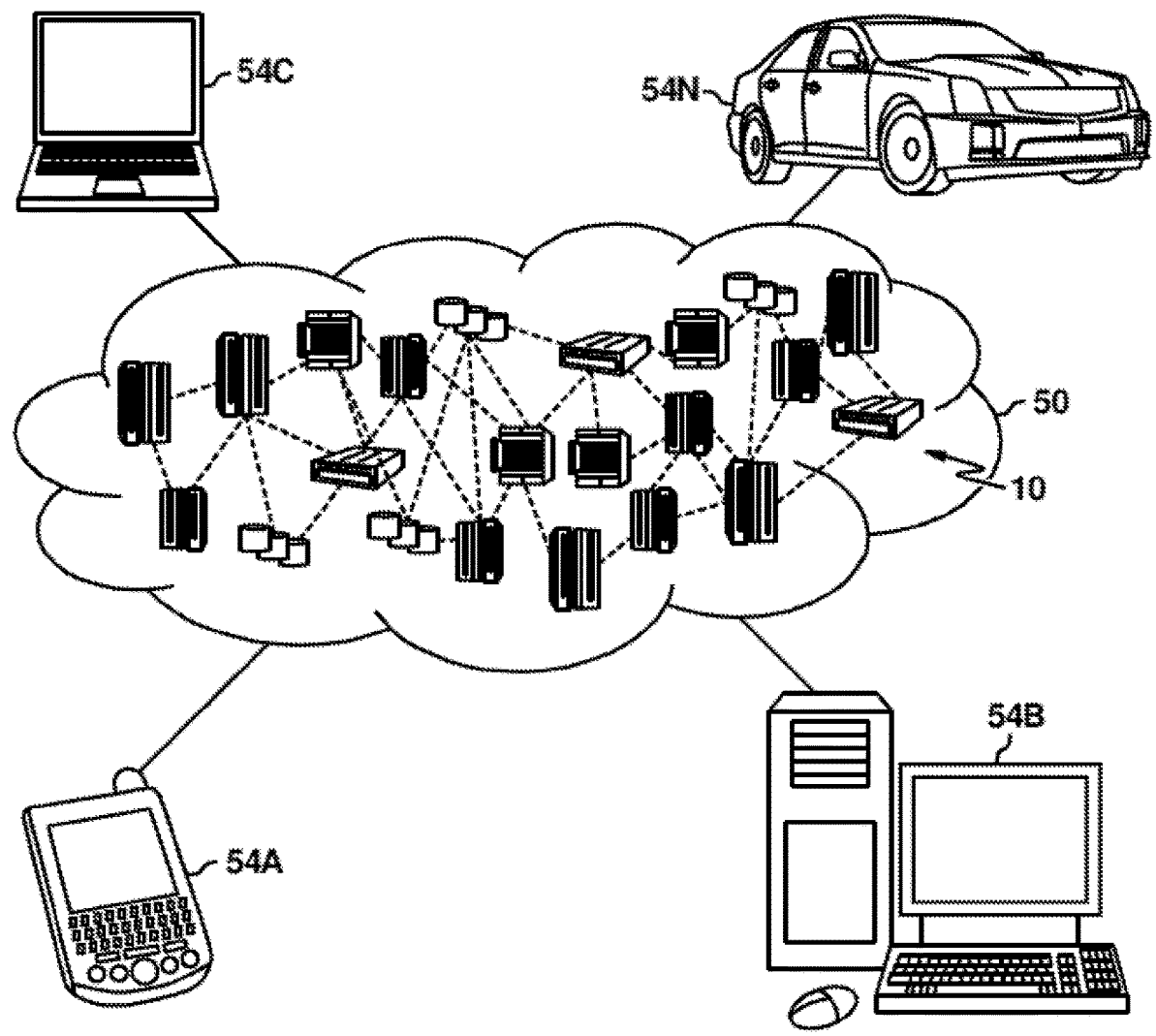
FIG. 7 depicts a cloud computing environment according to at least one embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
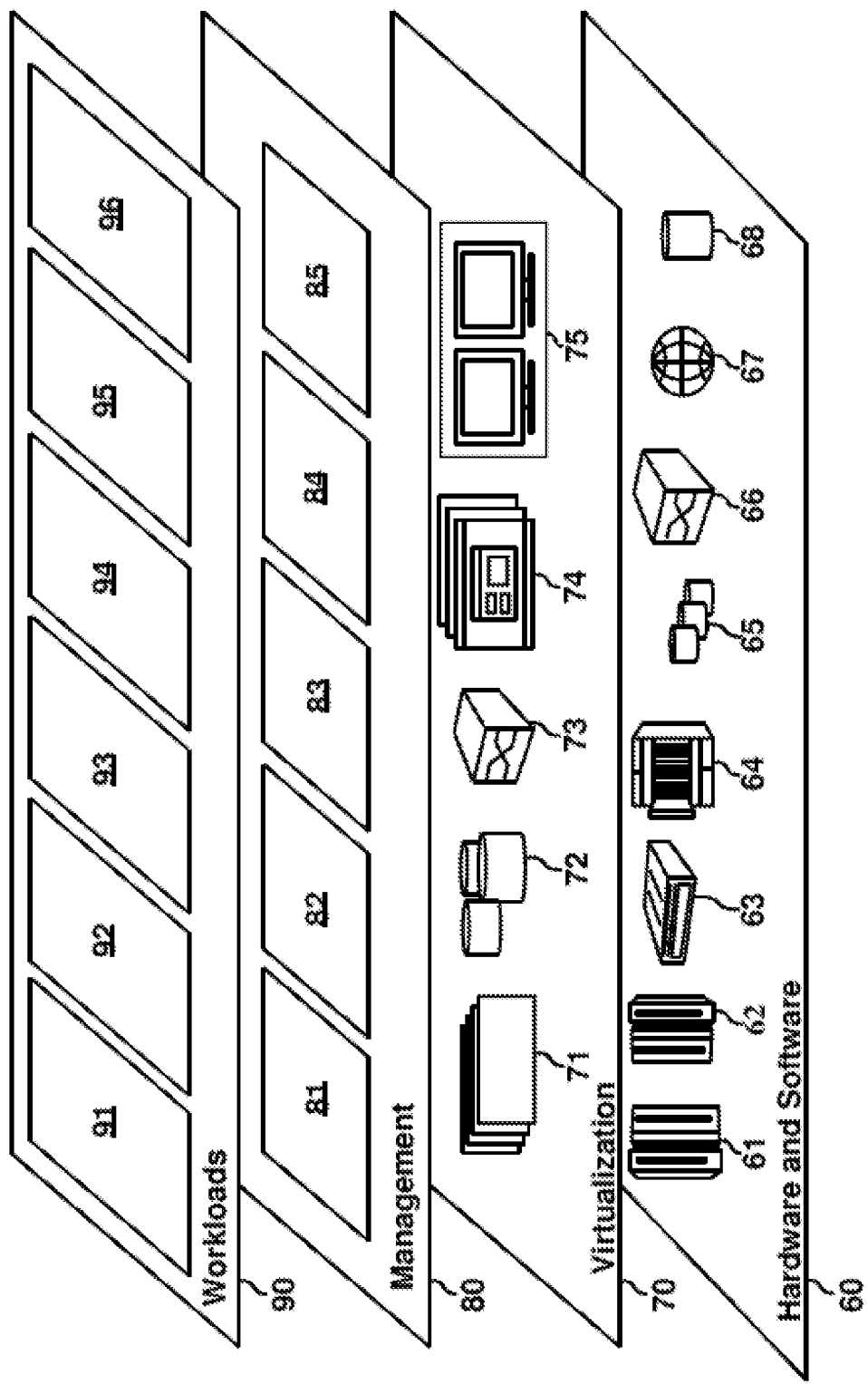
FIG. 8 depicts abstraction model layers according to at least on embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 9:
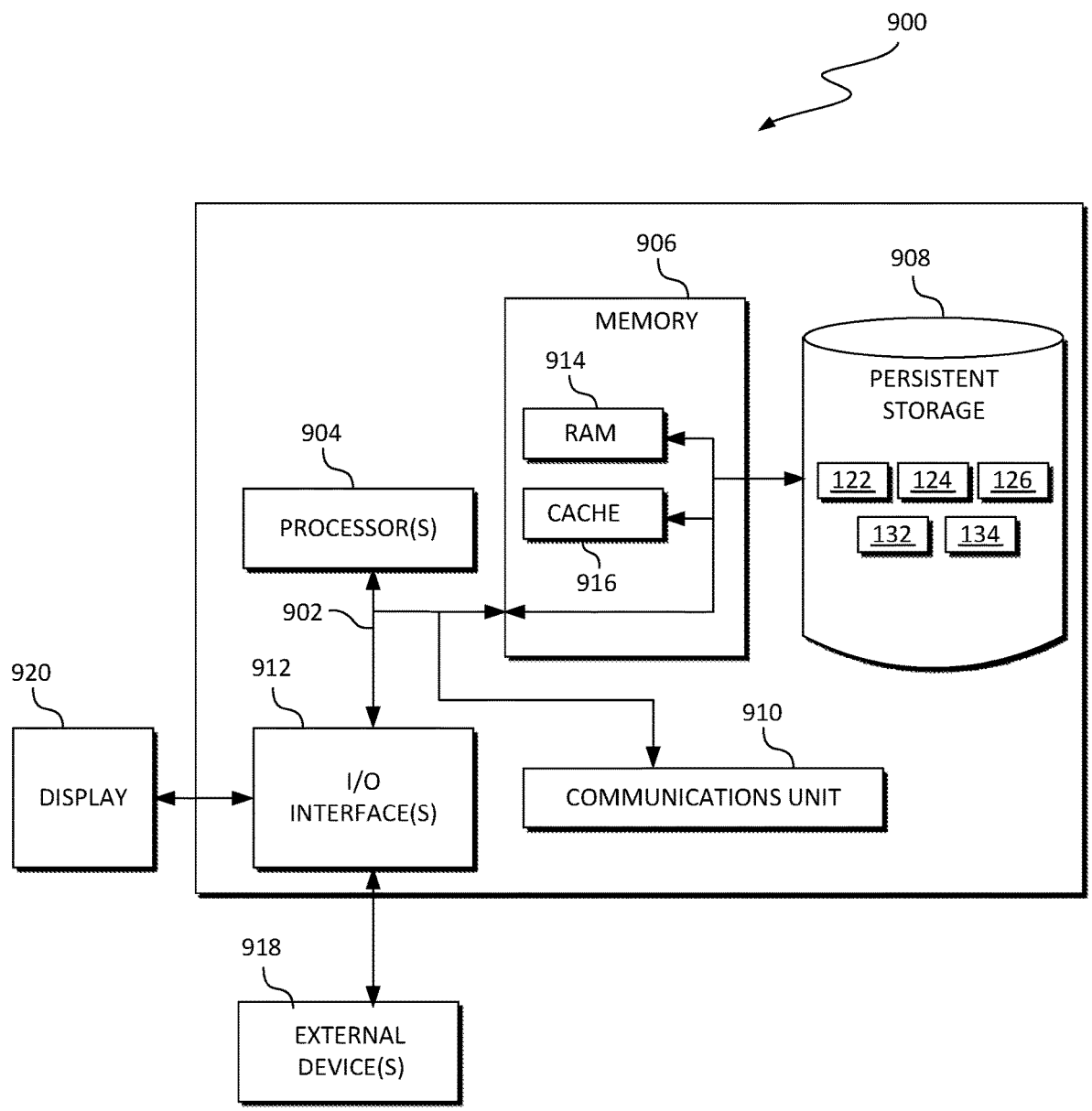
FIG. 9 depicts a block diagram of components of one or more computing devices within the computing environment depicted in FIG. 1, in accordance with an exemplary embodiment of the present invention.

FIG. 9 depicts a block diagram, 900, of components of computer system 120, client device 130, and 3D printer 140, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computer system 120, client device 130, and 3D printer 140 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 914 and cache memory 916. In general, memory 906 can include any suitable volatile or non-volatile computer-readable storage media.

Holographic modeling program 122, computer interface 124, database 126, client program 132, and sensors 134 are stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices, including resources of network 110. In these examples, communications unit 910 includes one or more network interface cards. Communications unit 910 may provide communications through the use of either or both physical and wireless communications links. Holographic modeling program 122, computer interface 124, database 126, client program 132, and sensors 134 may be downloaded to persistent storage 908 through communications unit 910.

I/O interface(s) 912 allows for input and output of data with other devices that may be connected to computer system 120, client device 130, and 3D printer 140. For example, I/O interface 912 may provide a connection to external devices 918 such as a keyboard, keypad, a touch screen, and/or some other suitable input device. External devices 918 can also include portable computer-readable storage media such as, for example, thumb drives, portable optical or magnetic disks, and memory cards. Software and data used to practice embodiments of the present invention, e.g., holographic modeling program 122, computer interface 124, database 126, client program 132, and sensors 134, can be stored on such portable computer-readable storage media and can be loaded onto persistent storage 908 via I/O interface(s) 912. I/O interface(s) 912 also connect to a display 920.

Display 920 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
   identifying, by one or more processors, one or more sensors worn by a user, wherein the one or more sensors are within a ring device worn by the user, the ring device comprising a holographic projector configured to project a three dimensional (3D) object, the one or more sensors track the user's hand and individual finger movements, and the ring device orientates a holographic projection of the 3D object relative to a position and direction of the user's hand and fingers;
   monitoring, by the one or more processors, during production of the 3D object, the one or more sensors for modification to the holographic projection representing the 3D object, wherein the user's hand and finger movements modify shape, dimension and texture of the holographic projection representing the 3D object;
   identifying, by the one or more processors, a modification to the 3D object represented by the holographic projection being manipulated by the hand and finger movements of the user;
   generating, by the one or more processors, a modification request based, at least in part, on the identified modification; and
   updating, by the one or more processors, production of the 3D object, based, at least in part, on the modification request, incorporating the modification to the shape, dimension and texture into unprinted portions of the 3D object while the 3D object is being printed.

2. The computer-implemented method of claim 1, further comprising:
   identifying, by the one or more processors, a second ring device wearable by a second user, said second ring device comprising a second holographic projector configured to project the holographic projection of the 3D object, wherein the second set of sensors of the second ring device track hand and finger movements of the second user; and monitoring, by the one or more processors, the second set of sensors, for modification to the holographic projection representing the 3D object, by the hand and finger movements of the second user, wherein modifications to the holographic projection representing the 3D object by the hand and finger movements of the second user are combinable with the modification of the 3D object by the user that is incorporated into the 3D object by the modification request.

3. The computer-implemented method of claim 2, the method further comprising:

monitoring, by the one or more processors, the production of the 3D object, wherein a portion of the 3D object has already been created;

determining, by the one or more processors, that the modifications of the 3D object represented by the holographic projection are associated with portions of the 3D object that have not already been created; and communicating, by the one or more processors, the modifications of the 3D object represented by the holographic projection to the ring device worn by the first user and the second ring device worn by the second user.

4. The computer-implemented method of claim 3, the method further comprising:

generating, by the one or more processors, an incompatibility alert in response to determining that the modifications of the 3D object represented by the holographic projection conflict with a modification of the 3D object represented by the holographic projection performed by the second user.

5. The computer-implemented method of claim 3, the method further comprising:

generating, by the one or more processors, an incompatibility alert in response to determining an incompatibility between the modifications of the 3D object represented by the holographic projection and the portion of the 3D object that has already been created.

6. The computer-implemented method of claim 3, further comprising:

locking, by the one or more processors, the 3D object, preventing one or more users from modifying the 3D object represented by the holographic projection while the user is currently modifying the 3D object represented by the holographic projection.

7. The computer-implemented method of claim 2, further comprising:

visually simulating, by the one or more processor, modifications generated by the hand and finger movements of the user to the holographic projection representing the 3D object, providing visualization of the modifications on the 3D object being displayed by the second holographic projector of the second ring device.

8. A computer program product comprising:

one or more non-transitory computer-readable storage media having program instructions stored on the non-transitory one or more computer-readable storage media, the stored program instructions executes a computer-implemented method comprising:

identifying one or more sensors worn by a user, wherein the one or more sensors are within a ring device worn by the user, the ring device comprising a holographic projector configured to project a three dimensional (3D) object, the one or more sensors track the user's hand and individual finger movements, and the ring device orientates a holographic projection of the 3D object relative to a position and direction of the user's hand and fingers;

monitoring during production of the 3D object, the one or more sensors for modification to the holographic projection representing the 3D object, wherein the user's hand and finger movements modify shape, dimension and texture of the holographic projection representing the 3D object;

identifying a modification to the 3D object represented by the holographic projection being manipulated by the hand and finger movements of the user;

generating a modification request based, at least in part, on the identified modification; and updating production of the 3D object, based, at least in part, on the modification request, incorporating the modification to the shape, dimension and texture into unprinted portions of the 3D object while the 3D object is being printed.

9. The computer program product of claim 8, further comprising:

identifying, by the one or more processors, a second ring device wearable by a second user, said second ring device comprising a second holographic projector configured to project the holographic projection of the 3D object, wherein the second set of sensors of the second ring device track hand and finger movements of the second user;

monitoring, by the one or more processors, the second set of sensors, for modification to the holographic projection representing the 3D object, by the hand and finger movements of the second user, wherein modifications to the holographic projection representing the 3D object by the hand and finger movements of the second user are combinable with the modification of the 3D object by the user that is incorporated into the 3D object by the modification request.

10. The computer program product of claim 9, further comprising:

monitoring the production of the 3D object, wherein a portion of the 3D object has already been created;

determining that the modifications of the 3D object represented by the holographic projection are associated with portions of the 3D object that have not already been created; and communicating the modifications of the 3D object represented by the holographic projection to the ring device worn by the first user and the second ring device worn by the second user.

11. The computer program product of claim 10, further comprising:

generating an incompatibility alert in response to determining that the modifications of the 3D object represented by the holographic projection conflict with a modification of the 3D object performed by the second user.

12. The computer program product of claim 10, further comprising:

generating an incompatibility alert in response to determining an incompatibility between the modifications of the 3D object represented by the holographic projection and the portion of the 3D object that has already been created.

13. The computer program product of claim 10, further comprising:

locking the 3D object, preventing one or more users from modifying the 3D object represented by the holographic projection while the user is currently modifying the 3D object represented by the holographic projection.

14. The computer program product of claim 9, further comprising:
visually simulating modifications generated by the hand and finger movements of the user to the holographic projection representing the 3D object, providing visualization of the modifications on the 3D object being displayed by the second holographic projector of the second ring device.

15. A computer system, the computer system comprising:
one or more computer processors;
a ring device comprising a holographic projector and one or more sensors within the ring device, said ring device placed in electronic communication with the one or more computer processors;
one or more non-transitory computer readable storage medium coupled to the one or more computer processors, wherein the non-transitory computer readable storage medium contain program instructions executing via the one or more processors, a computer-implemented method comprising:
identifying the one or more sensors of the ring device worn by a user, wherein the one or more sensors track the user's hand and individual finger movements of the user and orientate a holographic projection of a three dimensional (3D) object projected by the holographic projector of the ring device relative to a position and direction of the user's hands and fingers;
monitoring during production of the 3D object, the one or more sensors for modification to the holographic projection representing the 3D object, wherein the user's hand and finger movements modify shape, dimension and texture of the holographic projection representing the 3D object;
identifying a modification to the 3D object represented by the holographic projection being projected and being manipulated by the hand and finger movements of the user;
generating a modification request based, at least in part, on the identified modification; and
updating production of the 3D object, based, at least in part, on the modification request, incorporating the modification to the shape, dimension and texture into unprinted portions of the 3D object while the 3D object is being printed.

16. The computer system of claim 15, further comprising:
identifying a second ring device wearable by a second user, said second ring device comprising a second holographic projector configured to project the holographic projection of the 3D object, wherein the second set of sensors of the second ring device track hand and finger movements of the second user; and
monitoring the second set of sensors, for modification to the holographic projection representing the 3D object, by the hand and finger movements of the second user, wherein modifications to the holographic projection representing the 3D object by the hand and finger movements of the second user are combinable with the modification of the 3D object by the user that is incorporated into the 3D object by the modification request.

17. The computer system of claim 16, further comprising:
monitoring the production of the 3D object, wherein a portion of the 3D object has already been created;
determining that the modifications of the 3D object represented by the holographic projection are associated with portions of the 3D object that have not already been created; and
communicating the modifications of the 3D object represented by the holographic projection to the ring device worn by the first user and the second ring device worn by the second user.

18. The computer system of claim 17, further comprising:
generating an incompatibility alert in response to determining that the modifications of the 3D object represented by the holographic projection conflict with a modification of the 3D object performed by the second user.

19. The computer system of claim 17, further comprising:
generating an incompatibility alert in response to determining an incompatibility between the modifications of the 3D object represented by the holographic projection and the portion of the 3D object that has already been created.

20. The computer system of claim 17, further comprising:
locking the 3D object, preventing one or more users from modifying the 3D object represented by the holographic projection while the user is currently modifying the 3D object represented by the holographic projection.

* * * * *